United States Patent
Mirassou et al.

(10) Patent No.: US 10,267,657 B2
(45) Date of Patent: Apr. 23, 2019

(54) METHOD FOR AUTOMATIC CALIBRATION OF A CAMSHAFT SENSOR FOR A MOTOR VEHICLE

(71) Applicants: Continental Automotive France, Toulouse (FR); Continental Automotive GmbH, Hannover (DE)

(72) Inventors: David Mirassou, Toulouse (FR); Marie-Nathalie Larue, Corronsac (FR); Jérôme Burg, Plaisance du Touch (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/759,583

(22) PCT Filed: Sep. 1, 2016

(86) PCT No.: PCT/EP2016/001483
§ 371 (c)(1),
(2) Date: Mar. 13, 2018

(87) PCT Pub. No.: WO2017/045747
PCT Pub. Date: Mar. 23, 2017

(65) Prior Publication Data
US 2018/0259365 A1  Sep. 13, 2018

(30) Foreign Application Priority Data
Sep. 18, 2015  (FR) ...................................... 15 58814

(51) Int. Cl.
*G01D 5/244* (2006.01)
*G01D 5/14* (2006.01)
*G01D 18/00* (2006.01)

(52) U.S. Cl.
CPC .......... *G01D 5/2448* (2013.01); *G01D 5/145* (2013.01); *G01D 18/004* (2013.01)

(58) Field of Classification Search
CPC ..... G01D 5/2448; G01D 5/145; G01D 18/004
See application file for complete search history.

(56) References Cited

U.S. PATENT DOCUMENTS

| 5,917,320 A | 6/1999 | Scheller et al. |
| 2014/0195186 A1 | 7/2014 | Carbonne et al. |

(Continued)

FOREIGN PATENT DOCUMENTS

| FR | 1200168 A | 12/1959 |
| WO | 2004079385 A1 | 9/2004 |
| WO | 2013017211 A1 | 2/2013 |

OTHER PUBLICATIONS

International Search Report and Written Opinion for International Application No. PCT/EP2016/001483, dated Nov. 7, 2016, 9 pages.

(Continued)

*Primary Examiner* — Huy Q Phan
*Assistant Examiner* — Adam S Clarke
(74) *Attorney, Agent, or Firm* — RatnerPrestia

(57) ABSTRACT

A method for automatic calibration of a camshaft sensor for a motor vehicle, allowing reduction of the fluctuations on the output signal of the sensor. The method proposes comparing, on each target rotation, the new maximum values of the magnetic field of each tooth to the maximum values of the same teeth from the preceding target rotation. The switching thresholds are only calculated with the new maximum values if these differ from the maximum values of the preceding target rotation. Moreover, the invention proposes using a single minimum value of the magnetic field, i.e. the absolute minimum value on a target rotation in order to calculate the switching thresholds.

4 Claims, 2 Drawing Sheets

(56) References Cited

U.S. PATENT DOCUMENTS

| | | | | |
|---|---|---|---|---|
| 2014/0266176 A1* | 9/2014 | Fernandez | ............... | G01R 1/44 |
| | | | | 324/244 |
| 2014/0375312 A1* | 12/2014 | Friedrich | ................ | G01P 3/489 |
| | | | | 324/259 |
| 2016/0108842 A1* | 4/2016 | Mirassou | ............ | F02D 41/0097 |
| | | | | 73/1.41 |
| 2016/0356628 A1* | 12/2016 | Foletto | ................... | G01D 5/142 |
| 2017/0336225 A1* | 11/2017 | Burdette | ................. | G01D 5/14 |
| 2018/0356256 A1* | 12/2018 | Mirassou | ............... | G01D 5/145 |

OTHER PUBLICATIONS

International Preliminary Report on Patentability and Written Opinion for International Application No. PCT/EP2016/001483, dated Mar. 20, 2018, 9 pages.

\* cited by examiner

METHOD FOR AUTOMATIC CALIBRATION OF A CAMSHAFT SENSOR FOR A MOTOR VEHICLE

CROSS REFERENCE TO RELATED APPLICATIONS

This application is the U.S. National Phase Application of PCT International Application No. PCT/EP2016/001483, filed Sep. 1, 2016, which claims priority to French Patent Application No. 1558814, filed Sep. 18, 2015, the contents of such applications being incorporated by reference herein.

FIELD OF THE INVENTION

The present invention relates to a method for automatically calibrating a camshaft sensor for a motor vehicle. More particularly, it is a matter of determining automatically the "out-of-roundness" of a toothed wheel (also referred to as target) mounted on the end of a motor vehicle engine camshaft

BACKGROUND OF THE INVENTION

Camshaft sensors are used in a motor vehicle to determine the position of the various cylinders in the engine combustion cycle, namely to determine whether each cylinder is in the admission phase, the compression phase, the combustion phase or the exhaust phase. These sensors generally comprise a magnetic field generator (for example: a permanent magnet), a means of detecting the magnetic field (Hall-effect cell, magnetoresistive MR cell, giant magnetoresistive GMR cell, etc. for example) and an electronic circuit for processing the signal received by the means of detecting the magnetic field. These sensors, which are referred to as active sensors, deliver a digital signal to a central processor for processing.

The magnetic field generator may also be the target, made of a magnetic material, exhibiting an alternation of south poles and north poles. In that case, the sensor may or may not incorporate a permanent magnet, depending on the means of detection used. Hereinafter, the south and north poles will be likened to the teeth and troughs of a magnetic target.

In the known way, a camshaft sensor is associated with a target attached to a camshaft. This target takes the form of a disk, the periphery of which is toothed. These teeth have the same height but different spacings (troughs) and lengths, so as to perform encoding (known per se) of the position of the cylinders in the combustion engine combustion cycle for a motor vehicle.

The means of detecting the magnetic field, which is present in the sensor, detects the passage of the teeth of the target past it and the resulting signal makes it possible to determine the position of each signal with respect to the engine combustion cycle, in a way known per se.

In order to determine the position of each cylinder in the engine cycle the curve of the variations in magnetic field perceived by the camshaft sensor during a revolution of the target is observed. This curve exhibits a series of humps, each corresponding to one tooth of the target. By measuring the spacing between each of the humps and the duration of each, it is possible to determine the position of each cylinder with respect to the engine combustion cycle. In order to do this it is therefore important to guarantee the precision of the position of the electrical wavefronts of the signal generated by the sensor with respect to the position of the mechanical wavefronts of the target. Since each of its electrical wavefronts is indicative of the passage of the mechanical wavefronts of the tooth, the objective is to reduce to a minimum the phase shift in the signal caused by the fact that the sensor and the target are variably separated from one another. The electrical signal generated by the sensor changes state (high or low) when the mechanical signal crosses a predetermined switching threshold proportional to its amplitude. In order to do this, this switching threshold is fixed (at 75% of the amplitude, which corresponds to an optimum with regard to the precision between the electrical/mechanical wavefronts for most existing targets) in order to determine the instant at which each wavefront defining a tooth passes. Thus, as soon as a first maximum and a first minimum of the perceived magnetic field are detected, it is determined what switching threshold value corresponds to 75% of this amplitude, and it is considered that a falling front is being detected if the measured value of the magnetic field drops below this threshold value and, conversely, that a rising front is being detected if the measured value of the magnetic field rises above this switching threshold value (or vice versa).

By proceeding in this manner, the moment of detection of the front is optimized. However, this method presupposes that all the teeth have the same height and that there is no defect in geometry (sensors and target). Now, the sensors have the disadvantage of being sensitive to the positioning of the target on the camshaft and to the geometry of this target.

For cost reasons, the targets which are simple pieces of metal equipped with teeth of predetermined dimensions and predetermined spacings, are mass-produced and often exhibit imperfect geometry. In particular, the teeth do not always have the same height in relation to the center of the target. This defect is what is referred to as "out-of-roundness". It has the effect that the upper part of each tooth of the target is not positioned on the same circle centered on the camshaft. Hence the term "out-of-roundness" used to describe this problem. An out-of-roundness of the mounting of the target on the camshaft may be added to this out-of-roundness in the manufacture of the target. There are also defects with the air gap between the sensor and the target, these defects varying with time and being sensitive to temperature.

Of course, because the camshaft sensor measures variations in the magnetic field created by the passage of the teeth past it, if one tooth is lower (or taller) than the others, the separation between this tooth and the sensor varies in comparison with the other teeth and leads to a variation in the detected magnetic field. These variations in magnetic field may impair the measurements taken (impair the precision of the position of the electric wavefronts in relation to the mechanical wavefronts) or may even fail to be interpreted by the sensor (non-detection of a tooth, the magnetic field being below the switching threshold). The signal delivered by the camshaft sensor is then erroneous and correct determination of the position of each cylinder in the engine cycle is corrupted or even impossible.

In order to alleviate the phenomena of "out-of-roundness" and/or of "airgap defect", it is known practice in the prior art to calibrate the magnetic field detection means to take account of this "out-of-roundness" and/or of this "airgap defect" and thus deliver a corrected measurement (better electrical/mechanical wavefront precision and elimination of the risk of non-detection of a tooth) to the central processor tasked with determining the position of each cylinder in the engine cycle.

To this end, the switching threshold is recalculated after the passage of the maximum and of the minimum of each new tooth, according to the new amplitude of the magnetic field upon each passage of a tooth past the sensor.

The switching threshold is therefore recalculated after each passage of a tooth, according to the last maximum and the last minimum measured for the magnetic field. However, this method of automatically calibrating a camshaft sensor of the prior art has a major disadvantage: it creates on the sensor output signal disturbances referred to as "jitters" because, effectively, the switching threshold is recalculated and is different for each tooth and, in addition, noise from the sensor and from its amplification sequence is added to the measured magnetic field. As a result, the signal is not repeatable and varies slightly with each revolution of the target. This non-repeatability of the signal is caused, as explained earlier, by the automatic calibration of the sensor in an attempt to alleviate the "out-of-roundness" and/or the "airgap defect", combined with the electronic noise present on the measurement of the magnetic signal.

The variation ("jitter") on the output signal from the sensor may, for example, prevent the camshaft timing from being detected, when this is controlled by a VVT (Variable Valve Timing) system.

SUMMARY OF THE INVENTION

An aspect of the present invention proposes a method for automatically calibrating a camshaft which makes it possible to alleviate this disadvantage. In this particular instance, the calibration method according to an aspect of the invention allows the camshaft sensor to deliver an output signal that is more stable than that of the prior art yet allows the "out-of-roundness" of a target and the "airgap defect" of the air gap between the sensor and the target to be determined and corrected.

An aspect of the invention proposes a method for automatically calibrating a motor vehicle engine camshaft sensor, said engine comprising at least one camshaft, a toothed coded target associated with this camshaft and a magnetic field sensor placed near the target to detect the magnetic field variations induced by the passage of the teeth of the target near the sensor, said sensor delivering an electrical signal indicative of teeth and troughs of the target according to a predetermined switching threshold dependent on the amplitude of the magnetic field, said method consisting in continuously measuring the value of the magnetic field, said method comprising the following steps:

during a first revolution of the target:
Step 1: measuring a maximum value and a minimum value for the magnetic field for each tooth,
Step 2: calculating an amplitude of the magnetic field for said teeth, and calculating the switching threshold for each tooth according to the amplitude thus calculated,
said method being noteworthy in that it further comprises the following steps:
Step 3: measuring an absolute minimum value for the magnetic field over the full revolution of the target,
Step 4: storing the maximum values and the absolute minimum value in memory,
then, for each further revolution of the target:
Step 5: measuring and storing the new maximum value of the magnetic field for each tooth, and the new absolute minimum value over the full revolution of the target,
Step 6: comparing the absolute value of the difference between the new maximum value and the maximum value stored in memory for the previous revolution of the target which are associated with that same said tooth and the absolute value of the difference between the maximum value for that same said tooth and the absolute minimum value for the previous revolution of the target, and if the absolute value of the difference between the new maximum value and the maximum value from the previous revolution of the target is higher than a percentage of the absolute value of the difference between the maximum value and the absolute minimum value for the previous revolution of the target.

Namely, if $$|Bmaxi - Bmaxi'| > K \times |Bmaxi - Bmin|$$

Where:
K is a factor comprised between 0.003 and 0.1 (namely between 0.3% and 10%),
Bmaxi is the maximum value of the magnetic field stored in memory during the previous revolution of the target for a given tooth;
Bmaxi' is the new maximum value of the magnetic field during a further revolution of the target for that same given tooth;
Bmin is the absolute minimum value of the magnetic field stored in memory during the previous revolution of the target.

Then:
Step 7: calculating the switching threshold with the new maximum value and with the absolute minimum value stored in memory from the previous revolution, and replacing the maximum values stored in memory from the previous revolution of the target with the new maximum values.
Else:
Step 8: calculating the switching threshold with the maximum value and with the absolute minimum value both stored in memory from the previous revolution of the target,
Step 9: repeating steps 5 to 8 for each new revolution of the target.

Thus, the switching thresholds are not recalculated for each passage of a tooth, for each new revolution of the target. The new maximum values of the magnetic field from one revolution of the target are compared, tooth by tooth, with the maximum values from the previous revolution of the target. The switching thresholds are updated according to the result of this comparison; in other words, only if the new maximum values differ (according to the predefined criteria mentioned hereinabove) from the maximum values of the previous revolution of the target. In addition, in order to calculate the switching thresholds the only parameter considered is a single minimum value of the magnetic field, namely the absolute minimum value, rather than, as in the prior art, the minimum value for each tooth.

The method of an aspect of the invention makes it possible to considerably reduce the variations (jitter) on the sensor output signal.

For preference, the first revolution of the target is performed each time power is applied to the camshaft sensor.

An aspect of the invention also relates to a motor vehicle engine camshaft sensor, said engine comprising at least one camshaft, a toothed coded target associated with this camshaft and a magnetic field sensor placed near the target to detect the magnetic field variations induced by the passage of the teeth of the target near the sensor, said sensor continuously measuring the value of the magnetic field and delivering an electrical signal indicative of teeth and troughs of the target according to a predetermined switching threshold dependent on the amplitude of the magnetic field, said sensor comprising:

Means for measuring a maximum value and a minimum value for the magnetic field for each passage of a tooth, Means for calculating the amplitude of the magnetic field for each tooth and for calculating the switching threshold, said sensor being noteworthy in that it additionally comprises:

Means for measuring an absolute minimum value for the magnetic field over one full revolution of the target, Means for memory-storing the maximum value associated with said tooth, and the absolute minimum value over a full revolution of the target, Means for comparing, for each tooth, the absolute value of the difference between a new maximum value and the maximum value stored in memory for the previous revolution of the target which are associated with said tooth and the absolute value of the difference between the maximum value for said tooth and the absolute minimum value for the previous revolution of the target, Means for calculating a switching threshold according to the result of the comparison.

An aspect of the invention also applies to any motor vehicle comprising a camshaft sensor as described above.

BRIEF DESCRIPTION OF THE DRAWINGS

Other features and advantages of the present invention will become more apparent from reading the following description, provided by way of non-limiting example and with reference to the appended drawings, in which.

DETAILED DESCRIPTION OF THE PREFERRED EMBODIMENTS

Figure 1:
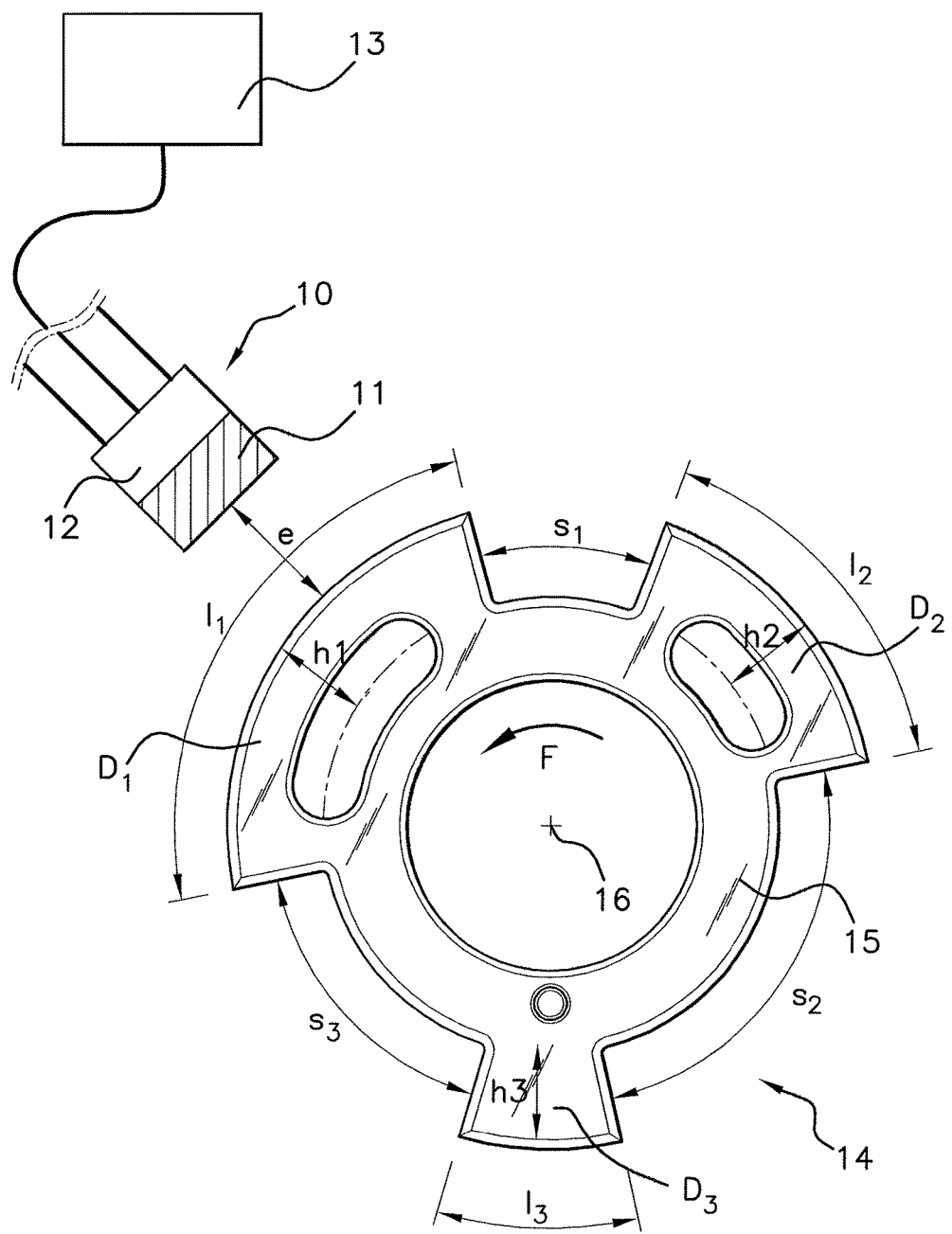
FIG. 1 is a schematic view in cross section, depicting a camshaft sensor and its associated target.
Figure 2:
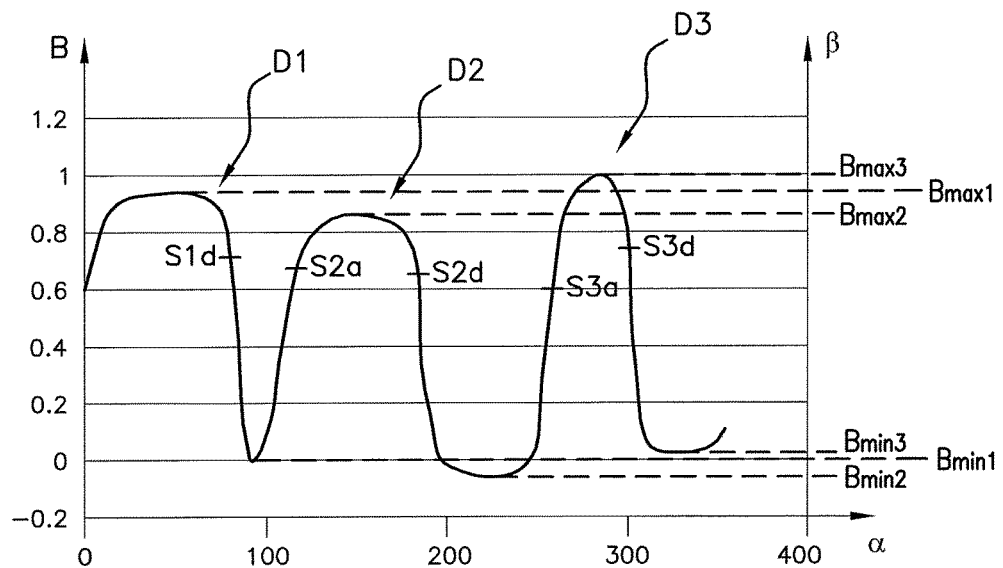
FIG. 2 illustrates an example of curves of the variation in magnetic field perceived by a sensor associated with a target during the first revolution of the target.
Figure 3:
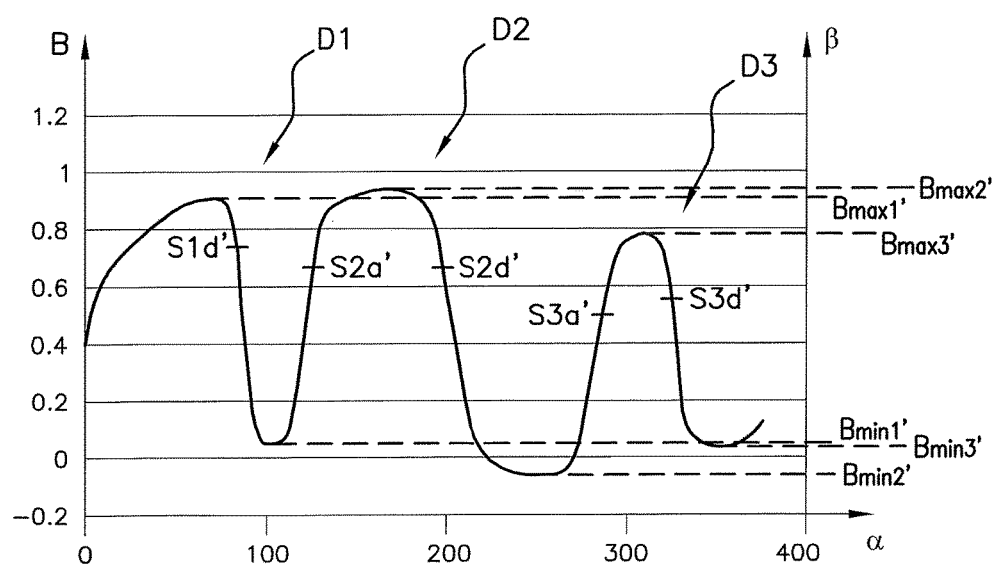
FIG. 3 illustrates an example of curves of the variation in magnetic field perceived by a sensor associated with the target during a revolution after the first revolution of the target.

According to the embodiment described and depicted in FIGS. 1 to 3, a camshaft sensor 10 comprises a ferromagnetic element 11 and a magnetic field detection means 12 (for example a Hall-effect cell). This sensor 10 delivers a digital signal to a central processor 13.

A target 14 associated with this sensor 10 takes the form of a metal disk 15 firmly attached to a camshaft 16. This target bears, on its periphery, a plurality teeth $D_1$, $D_2$, $D_3$ (3 in the example depicted) of different heights h1, h2, h3 and of variable lengths $l_1$ to $l_3$ and variable spacings (troughs) $s_1$ to $s_3$. These variable lengths and variable spacings in the way known per se constitute a coding.

The way in which a sensor 10 plus target 14 assembly works is described hereinafter.

When the target 14 is rotationally driven (arrow F FIG. 1) by the camshaft 16, sensor 10 perceives a series of variations in the magnetic field B indicative of the length l of the teeth $D_1$, $D_2$, $D_3$ moving past it and of their spacings $s_1$, $s_2$, $s_3$. The curve thus obtained, for example during the first revolution of the target, is depicted in FIG. 2.

In this FIG. 2, the abscissa axis indicates the angles α of the engine cycle varying from 0° to 360° and the ordinate axis indicates the value B of the magnetic field perceived (field normalized as a function of air gap). As indicated in FIG. 2, the teeth $D_1$, $D_2$, $D_3$ are not of the same height h1, h2, h3 and the target 14 exhibits a small defect in its geometry. Because of this, the maximum field perceived by the sensor 10 as each of the teeth $D_1$, $D_2$, $D_3$ passes by varies for each of the three teeth and adopts the respective values Bmax1, Bmax2, Bmax3. Likewise, the minimum field perceived by the sensor 10 as each of the teeth $D_1$, $D_2$, $D_3$ passes by varies from tooth to tooth and adopts the respective values Bmin1, Bmin2, Bmin3. This FIG. 2 shows the passage of three teeth $D_1$, $D_2$, $D_3$, the first two ($D_1$, $D_2$) being relatively closely spaced, the first tooth $D_1$ being wider than the second tooth $D_2$ and the passage of a third tooth $D_3$ which is narrower and more distant from the second tooth $D_2$. This in effect corresponds to the geometry of the target 14 depicted in FIG. 1.

It is known practice to detect the passage of a tooth front as soon as the magnetic field B perceived rises above or drops below a predetermined switching threshold proportional to the amplitude of the field perceived during the passage of a tooth (75% of (Bmax1−Bmin1) for example).

The threshold values are embodied in FIG. 2 as dotted lines. After the first tooth $D_1$ has passed by, a switching threshold for the rising front of the second tooth S2a is calculated using the following mathematical formula:

$$S2a=0.75*(Bmax1-Bmin1)$$

Then, after the maximum value of the magnetic field B upon passage of the second tooth Bmax2 has been crossed, a new switching threshold S2d is calculated for the falling front of the second tooth $D_2$:

$$S2d=0.75*(Bmax2-Bmin1)$$

This process is repeated, for the passage of each tooth, when a new maximum value or new minimum value of the magnetic field B has been measured.

It should be noted that the maximum value and the minimum value of the magnetic field B for each tooth correspond to the last recorded maximum and minimum values.

For example, in order to calculate the switching threshold for the rising front of the second tooth S2a, it is a matter of considering the last recorded maximum values and minimum value of the magnetic field B, that is to say Bmax1 and Bmin1, namely the maximum value and the minimum value of the magnetic field B after the passing of the first tooth $D_1$.

Similarly, in order to calculate the switching threshold for the falling front of the second tooth S2d, use is made of the last recorded maximum and minimum values, in this instance Bmin1 and Bmax2, namely the minimum value of the magnetic field B associated with the first tooth $D_1$ and the maximum value of the magnetic field associated with the second tooth $D_2$.

For the sake of simplification, the last measured maximum or minimum values, which are taken into consideration for calculating the switching threshold for a tooth, will be referred to here as the "maximum value (Bmaxi)" and/or "the minimum value (Bmini) which are associated with said tooth Di".

The target 14 associated with the camshaft 16 may, however, exhibit geometric imperfections which vary over time. In particular, the target 14 may exhibit an "airgap" which increases over time, or with temperature. In that case, when the target 14 is rotationally driven, during a revolution after the first revolution, the passage of its teeth $D_1$, $D_2$, $D_3$ past the sensor 10 causes variations in the magnetic field B as indicated in FIG. 3. In a similar way to FIG. 2 this curve indicates on the abscissa axis the angles α of the engine cycle and, on the ordinate axis, the magnetic field B normalized as a function of the airgap perceived by the sensor 10.

In this case, it may be noted that the new maximum value of the magnetic field B perceived for each of the teeth $D_1$, $D_2$, $D_3$, respectively, Bmax1', Bmax2', Bmax3' is not identical to the maximum value of the magnetic field perceived by each of those same teeth $D_1$, $D_2$, $D_3$ during the first revolution of the target 14 (cf. FIG. 2). Specifically, the first tooth $D_1$ is detected with a new maximum value Bmax1', the second tooth $D_2$ with a new maximum value Bmax2' and the third tooth $D_3$ with a new maximum value Bmax3'. The same can be said of the minimum values of the magnetic field B perceived by the sensor 10 upon the passage of each tooth, $D_1$, $D_2$, $D_3$. The new minimum values of the magnetic field B for each of the teeth, $D_1$, $D_2$, $D_3$ respectively Bmin1', Bmin2', Bmin3', are not identical to the minimum values of the magnetic field B, which were measured during the first revolution of the target 14, for the same teeth (Bmin1, Bmin2, Bmin3).

For the instance depicted in FIGS. 2 and 3:
Bmax1'<Bmax1,
Bmin1'>Bmin1,
Bmax2'=Bmax2,
Bmin2'<<Bmin2,
Bmax3'<<Bmax3,
Bmin3'=Bmin3.

As explained previously, it is known practice from the prior art to calculate the switching threshold on each passage of a tooth $D_1$, $D_2$, $D_3$ once a new maximum value (Bmaxi', Bmax2', Bmax3') or a new minimum value (Bmin1', Bmin2', Bmin3') of the magnetic field B has been measured for said tooth $D_1$, $D_2$, $D_3$.

What is meant here by a "new maximum value" is the maximum value of the magnetic field B of each tooth $D_1$, $D_2$, $D_3$ rather than the absolute maximum value of the magnetic field B over one full revolution of the target 14 for all teeth combined (which means to say, in this example, the maximum value of the magnetic field for all three teeth combined).

Similarly, what is meant by a "new minimum value" is the minimum value of the magnetic field B of each tooth $D_1$, $D_2$, $D_3$ rather than the absolute minimum value of the magnetic field B over one full revolution of the target 14, which means to say the absolute minimum value of the magnetic field B over one revolution of the target after all three teeth $D_1$, $D_2$, $D_3$ have passed, for all teeth combined.

However, this method of calibration generates disturbances on the output signal from the sensor 10, and these are undesirable.

An aspect of the invention proposes a calibration method that allows the output signal from the sensor 10 to be "smoothed", this signal exhibiting fewer disturbances than the signal of the prior art.

To this end, the method of an aspect of the invention proposes, during the first revolution of the target 14, for each tooth $D_1$, $D_2$, $D_3$, measuring the maximum value Bmax1, Bmax2, Bmax3, and the minimum value Bmin1, Bmin2, Bmin3 for each of said teeth $D_1$, $D_2$, $D_3$ (step 1).

Next, the amplitude of the magnetic field for said tooth $D_1$, $D_2$, $D_3$ is calculated as a function of the maximum values Bmax1, Bmax2, Bmax3 and of the minimum values Bmin1, Bmin2, Bmin3 measured for each tooth $D_1$, $D_2$, $D_3$, and the switching threshold is calculated as a function of the amplitude thus calculated (Step 2).

Namely:

$$Ai = B\mathrm{max}i - B\mathrm{min}i$$

And:

$$Si = k \times Ai$$

Where:
Si is the switching threshold,
k is a non-zero factor (equal for example to 0.75),
Ai is the amplitude of the magnetic field for the tooth Di,
Bmaxi is the maximum value for the tooth Di,
Bmini is the minimum value for the tooth Di.

This method for calculating the switching threshold is known from the prior art.

An aspect of the invention then proposes also measuring the absolute minimum value Bmin for the magnetic field B (Step 3) over the first revolution of the target 14. Then, in a fourth step, the maximum values Bmax1, Bmax2, Bmax3, associated with each tooth $D_1$, $D_2$, $D_3$ and the absolute minimum value Bmin of the magnetic field B of the first revolution of the target 14 are stored in memory. (Step 4).

Then, during each subsequent revolution of the target 14, and for each tooth $D_1$, $D_2$, $D_3$ the auto-calibration method of the invention comprises the following steps: during a fifth step (Step 5), for each tooth $D_1$, $D_2$, $D_3$ the new maximum value Bmax1', Bmax2', Bmax3' and the new absolute minimum value Bmin' of the magnetic field B are measured and stored in memory. Then, for each tooth $D_1$, $D_2$, $D_3$, the new maximum value Bmax1', Bmax2', Bmax3' is compared against the maximum value Bmax1, Bmax2, Bmax3 stored in memory during the previous revolution of the target, which means to say, in this example, during the first revolution of the target 14 and associated with that same said tooth $D_1$, $D_2$, $D_3$ (Step 6).

If the difference between the new maximum value Bmax1', Bmax2', Bmax3' and the maximum value Bmax1, Bmax2, Bmax3 from the previous revolution of the target 14 is higher, in terms of absolute value, than a percentage of the difference between the maximum value Bmax1, Bmax2, Bmax3 for said tooth and the absolute minimum value Bmin of the magnetic field B measured during the previous revolution of the target 14, or in other words, if:

$$|B\mathrm{max}i - B\mathrm{max}i'| > K \times |B\mathrm{max}i - B\mathrm{min}|$$

Where:
K is a factor comprised between 0.003 and 0.1 (namely between 0.3% and 10%),
Bmaxi is the maximum value of the magnetic field stored in memory during the previous revolution of the target 14 (in this instance the first revolution of the target) for a given tooth Di,
Bmaxi' is the new maximum value of the magnetic field during a further revolution of the target 14 for that same given tooth Di,
Bmin is the absolute minimum value of the magnetic field stored in memory during the previous revolution of the target 14 (in this instance the first revolution of the target).

Then, for each tooth $D_1$, $D_2$, $D_3$ the switching threshold is calculated using the new maximum value Bmaxi' associated with said tooth $D_1$, $D_2$, $D_3$ and/or (Step 7) (and the absolute minimum value Bmin stored in memory during the previous revolution of the target 14), and the stored values Bmax1, Bmax2, Bmax3 are replaced by the new measured maximum values Bmax1', Bmax2', Bmax3'. Else the switching threshold is calculated using the maximum value Bmax1, Bmax2, Bmax3 associated with said tooth $D_1$, $D_2$, $D_3$ and the absolute minimum value Bmin stored in memory during the previous revolution of the target 14 (Step 8), and the stored values (Bmax1, Bmax2, Bmax3) remain unchanged.

Then in the next step (Step 9), steps 5 to 8 are repeated for each new revolution of the target 14.

For the instance depicted in FIG. 3:

Bmin over the first revolution of the target (cf. FIG. 2) is equal to Bmin2; Bmin=Bmin2, Bmax1'<Bmax1, with |Bmax1−Bmax1'|<K×|Bmax1−Bmin|, with the effect that the new switching threshold for the falling front of the first tooth S1$d'$ of the revolution following the first revolution of the target, is calculated as a function of the maximum Bmax1 and minimum Bmin3 stored values (for each revolution of the target 14, the tooth that precedes the first tooth $D_1$ is the third tooth D3) of the magnetic field B of the first revolution of the target 14 which are associated with the first tooth $D_1$ and is equal to the switching threshold of the first revolution of the target 14 for the falling front of the first tooth S1$d$; S1$d'$=S1$d$, and the value Bmax1 stored in memory is not modified; it is not replaced by Bmax1', Bmax2'=Bmax2, with the effect that the new switching threshold for the falling front of the second tooth S2$d'$ during the revolution following the first revolution of the target 14 is equal to the switching threshold of the falling front of the second tooth S2$d'$ of the first revolution of the target 14; S2$d'$=S2$d$, and the value Bmax2 stored in memory is not modified, and is not replaced by Bmax2', Bmax3'<<Bmax3, where |Bmax3−Bmax3'|>K*|Bmax3−Bmin|, and so the switching threshold S3$d'$ for the revolution following the first revolution of the target is calculated as a function of Bmin and of Bmax3'; the value Bmax3 stored in memory is updated and replaced by Bmax3'.

Thus, according to the calibration method according to the invention, the value of the switching threshold is modified on the passage of each tooth $D_1$, $D_2$, $D_3$ only if the new maximum value Bmax1', Bmax2', Bmax3' of the magnetic field B associated with said tooth $D_1$, $D_2$, $D_3$ differs from the maximum value Bmax1, Bmax2, Bmax3, associated with that same said tooth $D_1$, $D_2$, $D_3$ measured during the previous revolution of the target 14. The difference between the two values needs to be higher than a predetermined value, calculated on the basis of the maximum value Bmax1, Bmax2, Bmax3 for each tooth $D_1$, $D_2$, $D_3$ and of the absolute minimum value Bmin of the magnetic field B from the previous revolution of the target 14, in order for the value of switching threshold to be modified.

As for the minimum value, which is used for calculating the switching threshold over a given revolution of the target 14, this is the absolute minimum value Bmin from the previous revolution.

The calibration method of the invention therefore makes it possible to considerably reduce the disturbances on the output signal of the sensor 10.

In addition, because the maximum values of the magnetic field B are compared on each new revolution of the target 14 against the maximum values measured and stored in memory during a previous revolution of the target 14, if "out-of-roundness" appears slowly (slow drift in the minimum and maximum values), it will be detected and corrected.

The invention also relates to a camshaft sensor 10 comprising:

Means for measuring a maximum value (Bmax1, Bmax2, Bmax3) and a minimum value (Bmin1, Bmin2, Bmin3) for the magnetic field (B) for each passage of a tooth ($D_1$, $D_2$, $D_3$), Means for calculating the amplitude of the magnetic field for each tooth and for calculating the switching threshold, Means for measuring an absolute minimum value (Bmin) for the magnetic field over one full revolution of the target (14), Means for memory-storing the maximum value (Bmax1, Bmax2, Bmax3) associated with said tooth ($D_1$, $D_2$, $D_3$), and the absolute minimum value (Bmin) over a full revolution of the target (14), Means for comparing, for each tooth ($D_1$, $D_2$, $D_3$), the absolute value of the difference between the new maximum value (Bmax1', Bmax2', Bmax3') and the maximum value (Bmax1, Bmax2, Bmax3) stored in memory for the previous revolution of the target (14) which are associated with said tooth ($D_1$, $D_2$, $D_3$) and the absolute value of the difference between the maximum value (Bmax1, Bmax2, Bmax3) and the absolute minimum value (Bmin) for the previous revolution of the target (14), Means for calculating a switching threshold (S1$d$, S2$a$, S2$d$, S3$a$, S3$d$, S1$d'$, S2$a'$, S2$d'$, S3$a'$, S3$d'$) according to the result of the comparison.

The measurement means, the memory-storage means, the means for calculating the amplitude of the magnetic field B, the comparison means and the means for calculating a switching threshold are, for example, software means incorporated into the sensor 10.

An aspect of the invention therefore provides an ingenious way of reducing disturbances on the output signal of the camshaft sensor while at the same time detecting and correcting "out-of-roundness" as soon as it appears.

The invention claimed is:

1. A method for automatically calibrating a motor vehicle engine camshaft sensor, said engine comprising at least one camshaft, a toothed coded target associated with this camshaft and a magnetic field sensor placed near the target to detect magnetic field variations induced by the passage of the teeth of the target near the sensor, said sensor delivering an electrical signal indicative of teeth and troughs of the target according to a predetermined switching threshold dependent on the amplitude of the magnetic field, said method continuously measuring the value of the magnetic field, said method comprising:

during a first revolution of the target:

Step 1: measuring a maximum value and a minimum value for the magnetic field (B) for each tooth, Step 2: calculating an amplitude of the magnetic field for said teeth, and calculating a switching threshold for each tooth according to the amplitude thus calculated, Step 3: measuring an absolute minimum value for the magnetic field over a full revolution of the target, Step 4: storing the maximum values and the absolute minimum value in a memory, then, for each further revolution of the target:

Step 5: measuring and storing a new maximum value of the magnetic field for each tooth, and a new absolute minimum value over the full revolution of the target, Step 6: comparing the absolute value of the difference between the new maximum value and the maximum value stored in the memory for the previous revolution of the target which are associated with that same said tooth and the absolute value of the difference between the maximum value of that same said tooth, and the absolute minimum value for the previous revolution of the target, if the absolute value of the difference between the new maximum value and the maximum value from the previous revolution of the target is higher than a percentage of the absolute value of the difference between the maximum value and the absolute minimum value for the previous revolution of the target, namely, if $$|B\mathrm{max}i - B\mathrm{max}i'| > K \times |B\mathrm{max}i - B\mathrm{min}|$$

where:
K is a factor comprised between 0.003 and 0.1 (namely between 0.3% and 10%),
Bmaxi is the maximum value of the magnetic field stored in the memory during the previous revolution of the target for a given tooth,
Bmaxi' is the new maximum value of the magnetic field for a further revolution of the target for that same given tooth, Bmin is the absolute minimum value of the magnetic field stored in the memory during the previous revolution of the target, then:
Step 7: calculating the switching threshold with the new maximum value and with the absolute minimum value stored in the memory from the previous revolution, and replacing the maximum values stored in the memory from the previous revolution of the target with the new maximum values, else:
Step 8: calculating the switching threshold with the maximum value and with the absolute minimum value both stored in the memory from the previous revolution of the target,
Step 9: repeating steps 5 to 8 for each new revolution of the target.

2. The automatic calibration method as claimed in claim 1, wherein the first revolution of the target is performed each time power is applied to the camshaft sensor.

3. A camshaft sensor calibrated by the method according to claim 1.

4. A motor vehicle comprising the camshaft sensor according to claim 3.

* * * * *